United States Patent [19]
Cromer et al.

[11] Patent Number: 5,311,294
[45] Date of Patent: May 10, 1994

[54] METHOD AND APPARATUS FOR SETTING THE COLOR BALANCE OF A COLOR DISPLAY DEVICE

[75] Inventors: Campbell Cromer, Gourock; Richard I. Knox, Bridge of Weir, both of Scotland

[73] Assignee: International Business Machines Corporation, Armonk, N.Y.

[21] Appl. No.: 916,242

[22] Filed: Jul. 17, 1992

[30] Foreign Application Priority Data

Jul. 20, 1991 [GB] United Kingdom .............. 0-9115723

[51] Int. Cl.$^5$ .................... H04N 9/73; H04N 17/02
[52] U.S. Cl. ............................. 348/180; 345/145; 345/904; 348/655
[58] Field of Search ............ 358/10, 29, 27, 75, 358/28, 139, 504; 355/35, 32, 38; 340/703, 701; 345/145, 140, 150, 904; H04N 9/73, 17/00, 17/02

[56] References Cited

U.S. PATENT DOCUMENTS

| | | | |
|---|---|---|---|
| 4,123,775 | 10/1978 | Bugni | 358/10 |
| 4,700,218 | 10/1987 | Thomsen et al. | 358/29 |
| 4,721,951 | 1/1988 | Holler | 340/701 |
| 4,831,437 | 5/1989 | Nishioka et al. | 358/27 |
| 5,119,182 | 6/1992 | Tsuboi et al. | 358/75 |
| 5,138,367 | 8/1992 | Okamoto | 355/35 |

FOREIGN PATENT DOCUMENTS

| | | |
|---|---|---|
| 0313795 | 5/1989 | European Pat. Off. |
| 0145481 | 9/1982 | Japan ................ 358/29 |
| 2178628 | 2/1987 | United Kingdom ............ 340/703 |

OTHER PUBLICATIONS

*A Reference Monitor for White Balance Adjustment*, Honijo et al.; SMPTE Journal, vol. 89, Oct. 1980, pp. 727–730.

*Primary Examiner*—Alvin E. Oberley
*Assistant Examiner*—Kara A. Farnandez
*Attorney, Agent, or Firm*—Mark S. Walker; W. A. Kinnaman, Jr.

[57] ABSTRACT

Apparatus for setting the color point of a color display device comprises a video signal generator for generating an image on the display device and a color analyzer for measuring the chromaticity of the image to produce digital coordinates corresponding to the color point of the image on a chromaticity reference chart. The apparatus further comprises a computer system connected to the color analyzer. The computer system includes interface means for reading the digital coordinates from the color analyzer, display means for displaying a cursor at a point corresponding to the coordinates within a graphical representation of the reference chart, and processor means for moving the cursor within the graphical representation in response to a change in the coordinates read from the color analyzer. The apparatus advantageously permits rapid adjustment of the color point of a display device to a desired value with a high level of measurement repeatability. Any recalibration of the apparatus can be performed by adjusting a set of digital values stored in the computer system.

2 Claims, 3 Drawing Sheets

METHOD AND APPARATUS FOR SETTING THE COLOR BALANCE OF A COLOR DISPLAY DEVICE

BACKGROUND OF THE INVENTION

1. Field of the Invention

The present invention relates to a method and apparatus for setting the color balance of a color display device such as a visual display unit for a computer system.

2. Description of the Related Art

An image generated by a color visual display device is defined by red, green and blue image components. These image components are generated by red, green and blue video signals. The color balance, which is sometimes referred to as the color point, of the display device is a measure of the relative intensities of these components when the video signals are arranged to produce a standard image in the form of a white block. The color point is generally specified as the coordinates corresponding to a white block on a chromaticity reference chart such as the well known CIE 1931 (x,y) Chromaticity Diagram or the like. In a color display device, the color point is determined by the relative gains of the red, green, and blue video channels of the device.

For example, in a cathode ray tube color display device, the color point is determined by phosphor coatings of the cathode ray tube, and by the relative gains of video amplifiers connected to the red, green, and blue electron guns. The gains of the video channels are dependent on electrical circuit parameters. These parameters may vary between different display devices manufactured on the same production line. There may therefore be a corresponding variation in color point between the devices. To compensate for such variation, the video channels are usually provided with adjustable gain controls. The gain controls permit color point adjustment when the display device is tested at the end of the production line. In a typical high volume manufacturing environment, this is performed in a manually operated test cell.

The test cell conventionally comprises a video signal generator and a television color analyzer (TVCA). The video signal generator is configured to generate red, green, and blue video signals for producing a standard white block image on a display device under test. The TVCA measures the chromaticity of the white block produced on the display device and produces outputs in the form of the coordinates (x,y) of the color point of the image on the chromaticity reference chart. An operator adjusts the gains of the video channels until the desired color point is obtained. Because each video channel gain affects the color point of the image, it requires skill to judge which gain control must be adjusted to correct the color point and obtaining the desired color point may involve several iterations of adjustment. This is time consuming and therefore impedes productivity in a high volume manufacturing environment.

U.S. Pat. No. 4,123,775 describes an apparatus and method for setting the color point of a color display device to a desired value. The apparatus comprises three photodetectors which are respectively sensitive to red, green and blue wavelengths of light. The photodetectors are connected to analog processing circuitry for driving an oscilloscope. In use, the photodetectors are directed towards an image displayed on a display device under test. The processing circuitry processes electrical signals from each of the photodetectors to generate a pair of color difference signals. The difference signals are applied to the horizontal and vertical timebases of an oscilloscope. The video channels of the display device are then adjusted until the trace on the oscilloscope reaches a "null" point indicating the desired color point has been obtained.

Because this apparatus operates by comparing two color difference signals, several iterations of adjustment may be required before the desired color point is obtained. The likelihood of this is increased where the display device under test comprises a CRT, in which there is usually an interaction between the red, green and blue electron guns during color point adjustment. Furthermore, because component values in the analog processing circuitry may vary, the apparatus requires periodic recalibration. Recalibration of the processing circuitry may also be necessary each time the required desired color point is changed.

It will therefore be appreciated that this apparatus is unsuitable for a high volume manufacturing environment.

SUMMARY OF THE INVENTION

In accordance with the present invention there is now provided apparatus for setting the color point of a color display device, the apparatus comprising: a video signal generator for generating an image on the display device, a color analyzer for generating digital coordinates corresponding to the color point of the image on a chromaticity reference chart, characterized in that the apparatus further comprises a computer system connected to the color analyzer, the computer system comprising: interface means for reading the digital coordinates from the color analyzer; display means for displaying a cursor at a point corresponding to the coordinates within a graphical representation of the reference chart; and processor means for moving the cursor within the graphical representation in response to a change in the coordinates read from the color analyzer.

This has the advantage that, because the adjustment of the color point of a color display device can be directly compared with a standard chromaticity reference chart such as the CIE 1931 Chromaticity chart, the adjustment can be directly traced to the National Bureau of Standards.

The computer system can store the numerical output from the TVCA. This advantageously permits a high level of measurement repeatability to be achieved, without requiring hardware adjustment, by compensating for spurious differences between similar measurements. It will also be appreciated that no hardware adjustment is necessary during any recalibration of apparatus of the present invention. Instead, any recalibration of the apparatus can be performed by changing a set of computer program values stored in the computer system According to a second aspect of the present invention, there is provided a method of setting the color point of a color display device, the method comprising: generating an image on the display device; generating digital coordinates corresponding to the color point of the image on a chromaticity reference chart; characterized in that the method further comprises: reading the digital coordinates from the color analyzer into a computer system; displaying a graphical representation of the reference chart on a display unit; displaying a cursor at a point corresponding to the digital coordinates; and moving the cursor within the graphical representation in response to a change in the digital coordinates.

BRIEF DESCRIPTION OF THE DRAWINGS

A preferred embodiment of the present invention will now be described, by way of example only, with reference to the accompanying drawing in which.

DESCRIPTION OF THE PREFERRED EMBODIMENT

Figure 1:
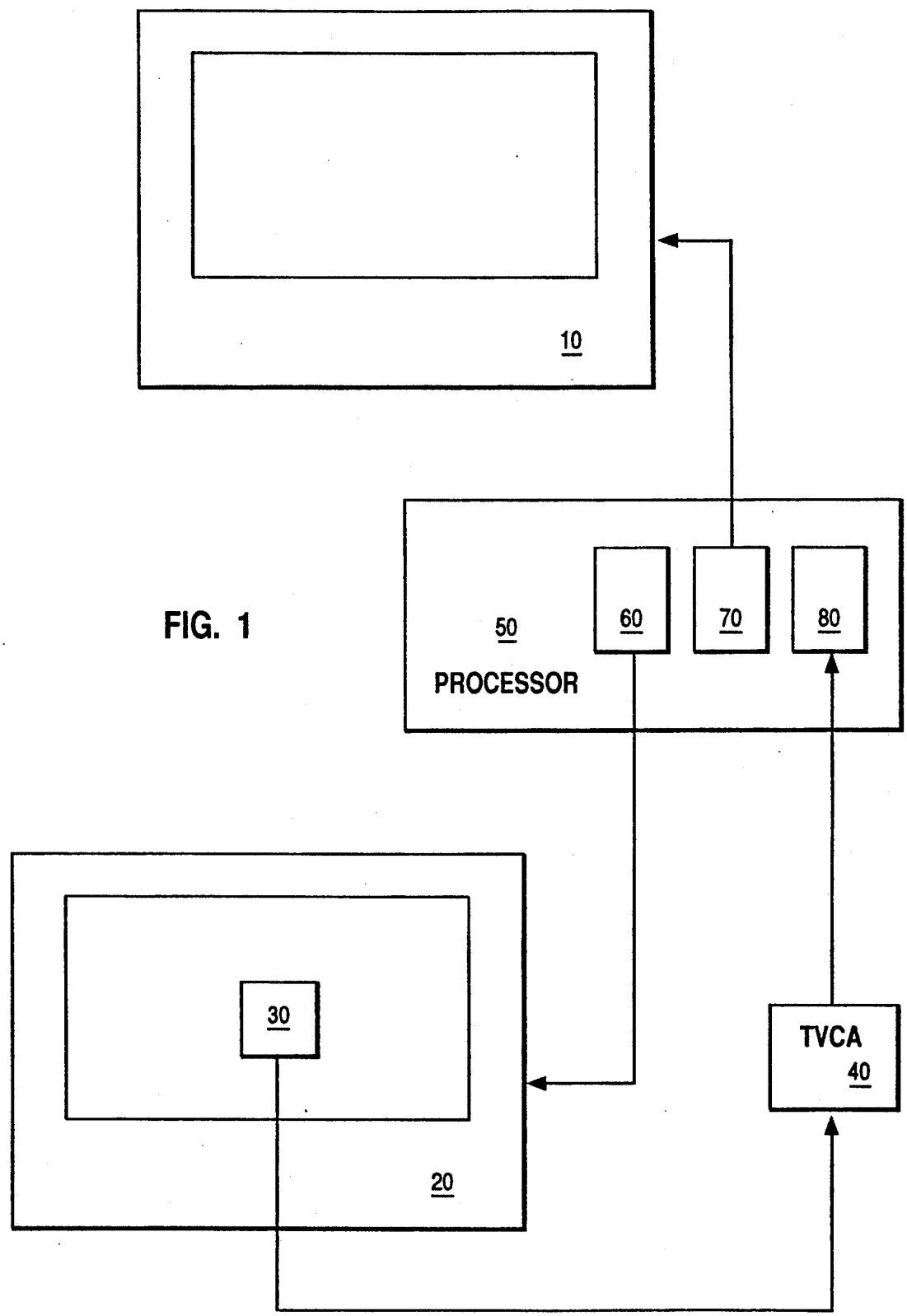
FIG. 1 is a block diagram of a test station of the present invention.

Referring first to FIG. 1, an example of a color display device test station of the present invention comprises a computer system 50 such as an IBM Personal Computer (IBM is a trademark of International Business Machines Corporation). The computer system 50 is connected to a digital television color analyzer (TVCA) 40 such as a Minolta television color analyzer (Minolta is a trademark of Minolta Corporation) by a peripheral interface bus such as an RS232 bus 80. The computer system 50 is connected to a visual display unit (VDU) 10 via a monochrome video adapter Port 70. In addition, the computer system 50 is connected to a display device under test 20 via a color video adapter port 60.

The TVCA 40 comprises a probe 30 having four light sensors (not shown) such as phototransistors. Each sensor is responsive to a different band of wavelengths within the visible spectrum.

Figure 2:
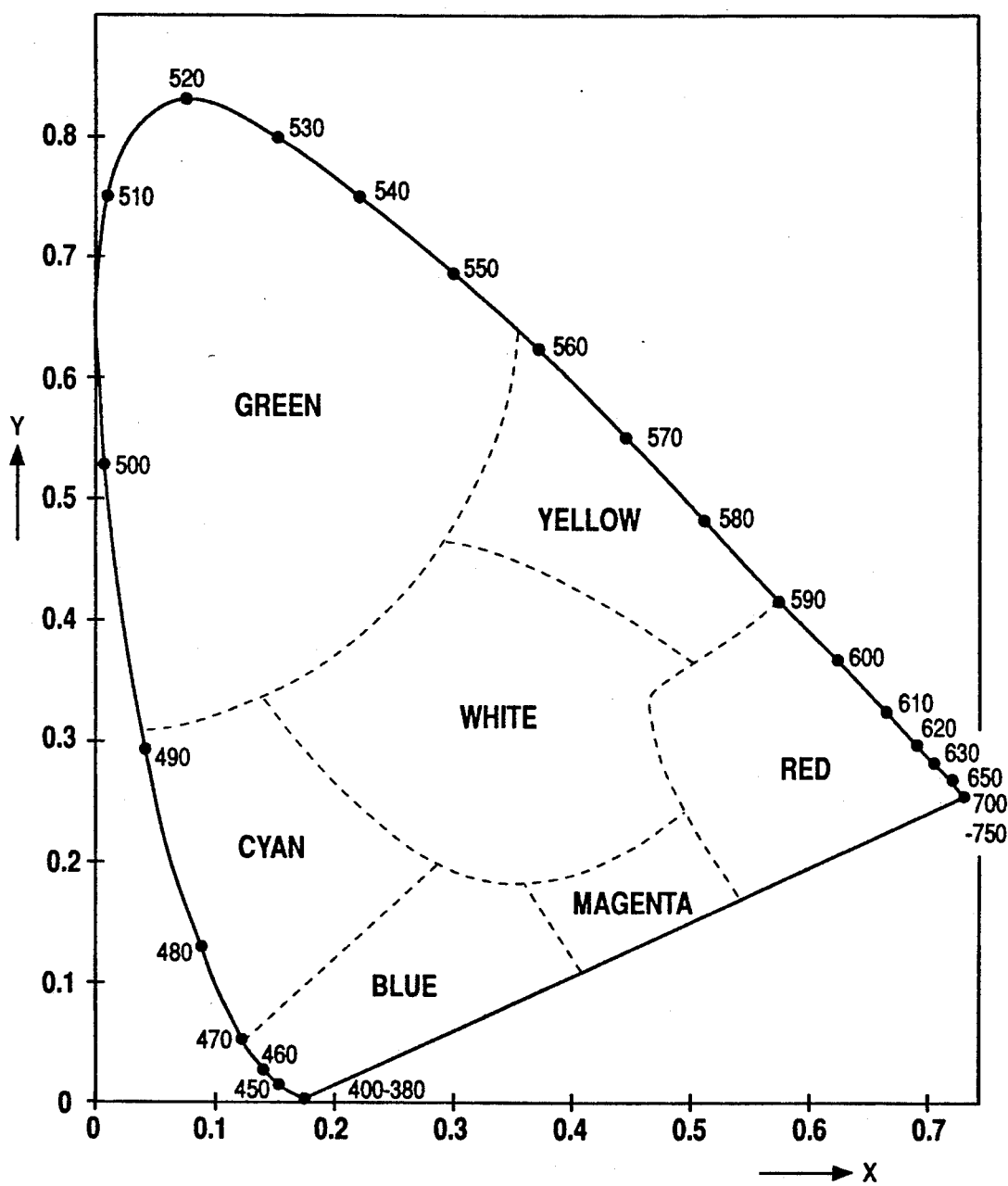
FIG. 2 is a simplified view of the CIE 1931 chromaticity diagram.

In use, the computer system 50 generates an image in the form of a white block on device under test 20. The probe 30 is then placed against the screen of device 20 to expose the sensors to the image. The sensors generate electrical signals which are proportional to the brightness and color point of the image. The TVCA 40 processes the currents to produce digital values representing the brightness of the image in candelas and the color point of the image in the form of coordinates on the CIE 1931 Chromaticity Chart shown in FIG. 2. The digital values are read from the TVCA 40 into the computer system 50 via the interface bus 80.

Figure 3:
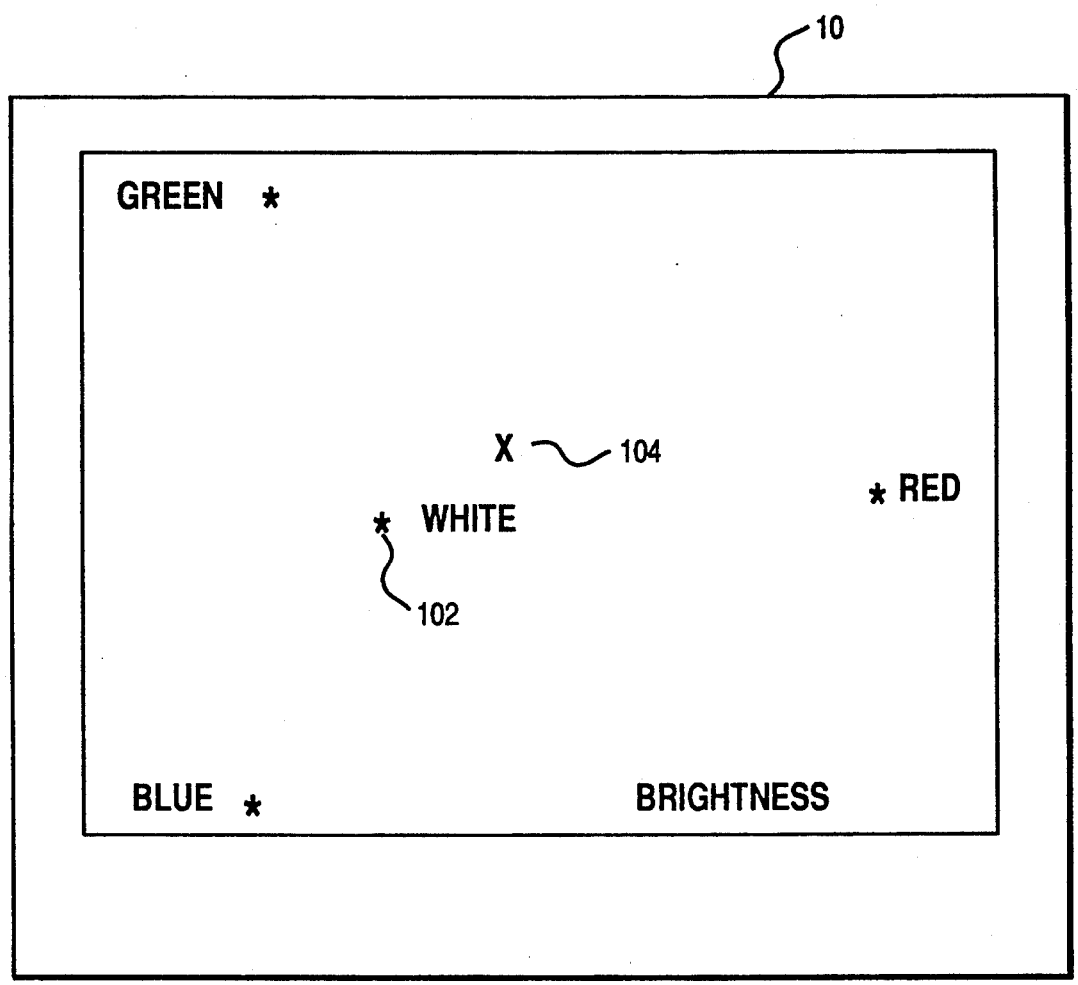
FIG. 3 is a front view of a display unit of the test station of the present invention.

Referring now to FIG. 3, a computer program, stored in computer system 50, instructs the computer system to generate a simplified representation of the CIE 1931 Chromaticity Chart on display unit 10 and to generate a target 120 indicating the position on the chart of the desired color point of device 20. It will be appreciated that the desired color point may be loaded into a memory of the computer system during an initialization of the apparatus. The program also instructs computer system 50 lo indicate the actual color point 104 of device 20 defined by the digital coordinates by displaying a cursor at the corresponding Point on the chart.

An increase in the gain of a video channel corresponding to a particular color (red, green or blue) causes rectilinear movement of the cursor towards the coordinates on the chart corresponding to that particular primary color. The chart displayed by the computer system therefore enables an unskilled operator to determine, in a relatively short period of time, the directions in which the cursor will move in response to adjustment of each video channel gain. Apparatus of the present invention therefore simplifies adjustment of the actual color point of a display under test to the desired color point. The graphic representation of the chart allows the operator, through experience, to predict the channel gains requiring adjustment to keep the cursor on a path from the actual color point to the desired color point. It will therefore be appreciated that the apparatus of the present invention enables the color point of a color display device to be set to a desired value with a reduced number of adjustment iterations. Furthermore, any interaction between video channels in the display under test, or spurious variations in screen efficiency between different displays under test, can be prevented from increasing adjustment time The embodiment of the present invention hereinbefore described, by way of example only, is configured in accordance with the CIE 1931 Chromaticity Chart. However, it will be appreciated other embodiments of the present invention may be configured in accordance with different chromaticity reference diagrams.

We claim:

1. Apparatus for setting the color point of a color display device, the apparatus comprising a video signal generator for generating an image on the color display device and a color analyzer for measuring the chromaticity of the image to produce digital coordinates corresponding to the color point of the image on a chromaticity reference chart, characterized in that the apparatus further comprises a computer system connected to the color analyzer, the computer system comprising:
    interface means for reading the digital coordinates from the color analyzer;
    means for generating a graphical representation of said chromaticity reference chart;
    color point target means for specifying a point on said reference chart representing a color point target;
    display means for displaying said graphical representation of said chromaticity reference chart, a cursor at a point corresponding to the coordinates within said graphical representation of the chromaticity reference chart and said color point target; and
    processor means responsive to said interface means for moving the cursor within the graphical representation in response to a change in the coordinates read from the color analyzer.

2. A method for setting the color point of a color display device, the method comprising generating an image on the color display device and measuring the chromaticity of the image using a color analyzer to produce digital coordinates corresponding to the color point of the image on a chromaticity reference chart, characterized in that the method further comprises:
    reading the digital coordinates from the color analyzer into a computer system;
    generating a graphical representation of said chromaticity reference chart;
    generating a color point target representing the desired color point within said reference chart;
    displaying the graphical representation of the reference chart on a second display device;
    displaying a cursor at a point corresponding to the digital coordinates on said second display device;
    displaying an indicator as said color point target on said second display device; and
    repeating the steps of reading the digital coordinates and displaying a cursor causing the cursor to move within the graphical representation in response to a change in the digital coordinates.

* * * * *